United States Patent [19]

Johnson

[11] Patent Number: 5,588,255
[45] Date of Patent: Dec. 31, 1996

[54] CAPILLARY WICK HYDROPONIC PROCESS

[76] Inventor: Christopher S. Johnson, 2679 B Walnut St., Los Alamos, N.M. 87544

[21] Appl. No.: 490,532

[22] Filed: Jun. 14, 1995

[51] Int. Cl.⁶ .................................................. A01G 31/02
[52] U.S. Cl. .......................................... 47/58; 47/62; 47/81
[58] Field of Search ................................ 47/81 M, 62 C, 47/64, 66 B

[56] References Cited

U.S. PATENT DOCUMENTS

| | | | |
|---|---|---|---|
| 2,026,322 | 12/1935 | Raines | 47/62 C |
| 2,072,185 | 3/1937 | Schein | 47/81 R |
| 2,491,124 | 12/1949 | Martin | 47/81 |
| 2,937,617 | 5/1960 | Brody | 47/81 R |
| 3,193,970 | 7/1965 | Green | 47/38.1 |
| 3,778,928 | 12/1973 | Green | 47/38.1 |
| 4,001,968 | 1/1977 | Green | 47/80 |
| 4,200,689 | 4/1980 | Knazek et al. | 435/2 |
| 4,211,037 | 7/1980 | Green | 47/62 |
| 4,305,226 | 12/1981 | Brown | 47/81 |
| 4,389,815 | 6/1983 | English | 47/81 R |
| 4,404,767 | 9/1983 | Enrich | 47/81 |
| 4,582,611 | 4/1986 | Wang | 210/747 |
| 4,953,322 | 9/1990 | Edwards | 47/64 |
| 5,081,035 | 1/1992 | Halberstadt et al. | 435/284 |

FOREIGN PATENT DOCUMENTS

| | | | |
|---|---|---|---|
| 1503197 | 10/1967 | France | 47/81 |
| 212661 | 5/1964 | Russian Federation | 47/81 R |
| 1397006 | 5/1988 | Russian Federation | 47/64 |

OTHER PUBLICATIONS

Oscar E. Meinzer "Outline of Ground–Water Hydrology" 1923 pp. 56–57.

*Primary Examiner*—Henry E. Raduazo

[57] ABSTRACT

A system for green plant and/or microbial culture featuring improved fluid control by the use of capillary drainage devices is described.

2 Claims, 1 Drawing Sheet

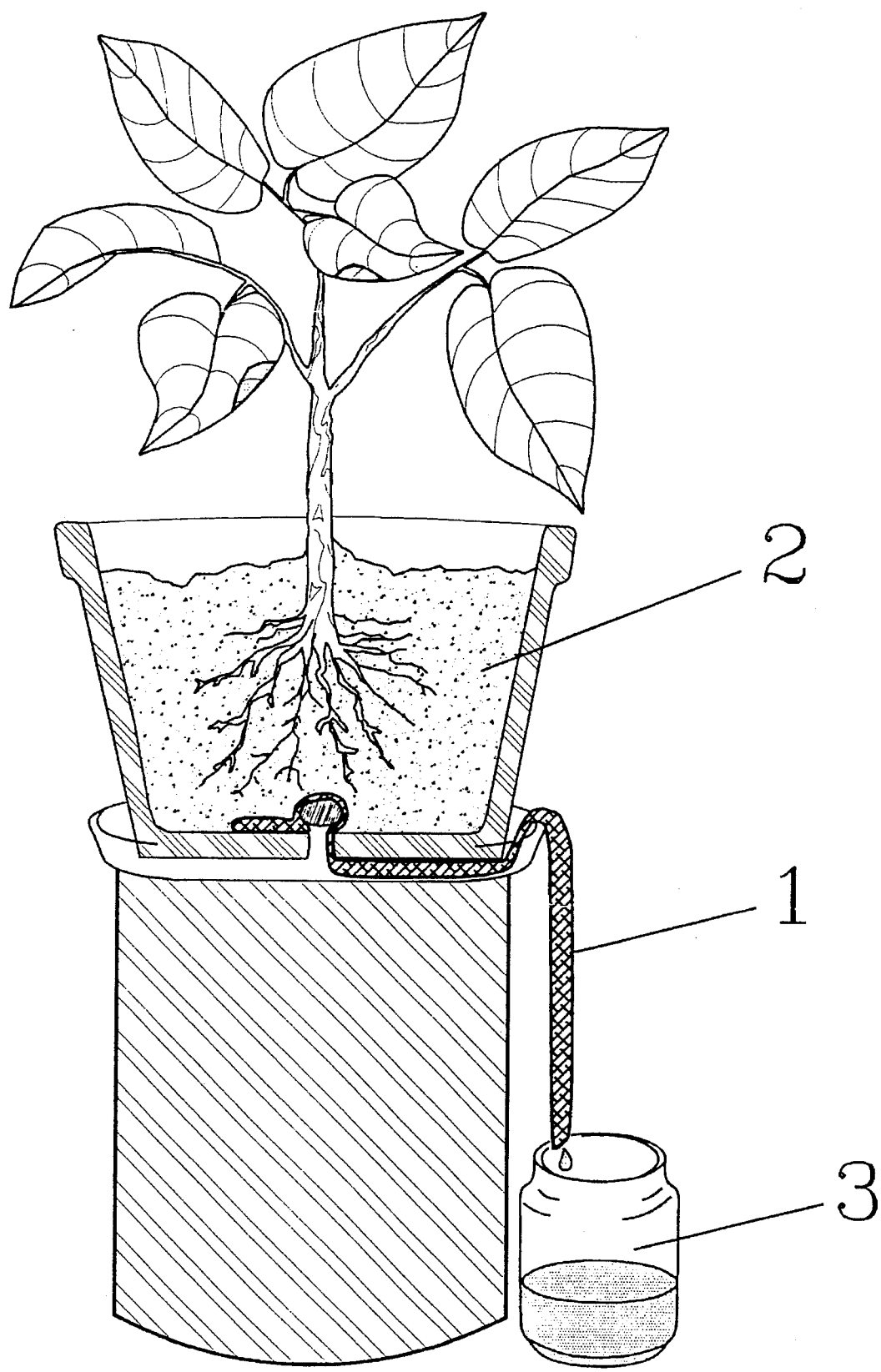

5,588,255

CAPILLARY WICK HYDROPONIC PROCESS

FIELD OF THE INVENTION

This invention relates to a method of improved fluid control for container culture of green plants or microorganism populations by the use of capillary action. Specifically it is a technique involving the recovery of fluid which is perfused through culture media by adsorption of the fluid to a capillary wick and subsequent acceleration of the fluid to a point where it is removed from the wick.

BACKGROUND OF THE INVENTION

The art of draining fluid from planting or bioculture media by capillary means was established in the 1949 patent of John Martin whose technique is later incorporated into the 1981 patent of Lawrence Brown. Limitations however are imposed on what exactly is drained from the container environment by the embodiments therein described, as well as on the rate at which drainage may occur. Both lift water using capillary wicks to a level above soil or culture media for the purpose of aiding the evaporation of excess water.

Martins device removes only water in the form of vapor, a slow process which requires that about 530 calories of heat energy per gram of water removed be input to the system. This slow process may allow anoxic conditions to develop to a point which may harm plants. In addition ion and colloid concentrations increase in the soil solution as does the concentration of organic matter with the removal of pure water.

Brown, who similarly uses wick means to aid the evaporation of water, adds an air pump and tubing mechanism to remove liquid as such from his culture vessels.

Neither Martin nor Brown uses capillary means to remove dissolved or suspended matter which may accumulate in considerable quantity as a result of metabolism, and neither makes use of capillary means to deliver liquid water for collection. Both use wick means solely as dispersal means for water molecules.

Green in one of several patents overcomes these difficulties by the use of sand filled pipe drains which terminate below his media and fluid supply systems thereby using capillarity, gravity, and surface tension to cause liquid to flow from the culture media. His use of sand requires a complicated special apparatus.

SUMMARY OF THE INVENTION

The immediate invention allows one to remove the substantially complete soil solution from the root or culture zone in culture or support media by the use of capillarity and gravity, and further to remove this solution at a rate capable of mitigating problems caused by the biochemical oxygen demand of soil or culture solution organisms and chemical processes more economically and conveniently than may be done with a sand drain.

The method includes the steps of placing one end of a capillary wick in contact with culture media where fluid to be drained tends to collect in the media, and then proceeding with said capillary means to the same or a lower elevation so that liquid is caused to flow, when it is present in adequate quantity, from the media to the free end of the wick where liquid is removed from the wick for return to the culture or for other disposal.

In addition to gravity, liquid removal from the wick by pump means or by angular acceleration of the liquid may be used to cause flow.

BRIEF DESCRIPTION OF DRAWING

In the drawing a polyester cloth strip(1) is partially embedded in potting soil/culture media(2) in which a plant and microbe population is growing such that part of the strip hangs below the lowest level of soil so as to provide a capillary conduit for fluid to move from the soil to a point where gravity may affect its removal from the cloth strip for collection. Gravity and surface tension accelerate fluid along the wick to its terminus where fluid is removed in a discontinuous fashion, as droplets, to prevent fluid returning to the media through the wick.

A collection vessel(3) is provided to allow fluid to be collected for return to the biological culture or for other disposal as desired.

DETAILED DESCRIPTION OF THE PREFERRED EMBODIMENTS

The process is ideally embodied by placing into contact with biological culture or support media a continuous flexible capillary wick means, preferably one end is embedded in the media at a point where fluid tends to collect. The capillary means is then communicated to an area removed or otherwise isolated from direct contact with the media and some force external to the hygroscopic material such as gravity is applied to the fluid, as by placing the second terminus at a lower elevation relative to the first, in order to induce flow in any water or solution or colloidal suspension which is capable of flow from said culture media to said isolated point for the purpose of collection of said liquid to be re-used or disposed of.

Return of liquid to the media by capillarity along the wick is prevented by any means, such as by removal of the greater portion of liquid in a non-continuous fashion as in the drawing, where liquid drips from the wick into the collection vessel.

Water and nutrients may be supplied to the media by any means.

I claim:

1. A green plant or microbial culture method involving the steps of:

1) providing a biological culture or support media which has a growing zone and a saturation zone, and 2) providing a watering means which will introduce water into said biological culture or support media and cause fluid to flow through said biological culture or support media towards said saturation zone, and 3) placing a capillary wick means in contact with said saturation zone in order to adsorb liquid solutions or suspensions which may contain metabolic products thereon while simultaneously or subsequently 4) applying an accelerating force such as gravity, liquid pump means, or centripetal force to said liquid for the purpose of recovering liquid water or to remove suspended or dissolved materials from the culture environment to a desired point of removal from the capillary wick means 5) where return flow of said liquid to said media by said wick means is substantially prevented, and where said plant or culture is supplied with nutrients from any supply means.

2. A method as in claim 1 where flow of liquid into culture or support media from the drainage wick means is substantially prevented by removal of said liquid from said wick means to a receptacle or collection area which is isolated from continuous liquid communication with said wick means.

* * * * *